(12) United States Patent
Hankins (10) Patent No.: US 9,817,742 B2
(45) Date of Patent: Nov. 14, 2017

(54) DETECTING HARDWARE AND SOFTWARE PROBLEMS IN REMOTE SYSTEMS

(71) Applicant: Compellent Technologies, Eden Prairie, MN (US)

(72) Inventor: Ryan Hankins, St. Paul, MN (US)

(73) Assignee: Dell International L.L.C., Round Rock, TX (US)

( * ) Notice: Subject to any disclaimer, the term of this patent is extended or adjusted under 35 U.S.C. 154(b) by 433 days.

(21) Appl. No.: 13/925,910

(22) Filed: Jun. 25, 2013

(65) Prior Publication Data
US 2014/0379714 A1  Dec. 25, 2014

(51) Int. Cl.
*G06F 17/30* (2006.01)
*G06F 11/30* (2006.01)
*G06F 11/07* (2006.01)

(52) U.S. Cl.
CPC ...... *G06F 11/3082* (2013.01); *G06F 11/0706* (2013.01); *G06F 11/0751* (2013.01); *G06F 11/3055* (2013.01); *G06F 2201/88* (2013.01)

(58) Field of Classification Search
USPC ................................................ 707/690, 737
See application file for complete search history.

(56) References Cited

U.S. PATENT DOCUMENTS

| 6,963,983 B2 * | 11/2005 | Munson et al. ................... 726/5 |
| 7,185,367 B2 * | 2/2007 | Munson .......................... 726/23 |
| 7,613,945 B2 | 11/2009 | Soran et al. |
| 8,090,592 B1 * | 1/2012 | Goodall ............... G06Q 10/063 705/2 |
| 8,104,087 B2 * | 1/2012 | Quinn ................ G06F 11/0748 717/172 |
| 8,225,402 B1 * | 7/2012 | Averbuch ............... H04L 63/14 717/141 |

(Continued)

OTHER PUBLICATIONS

"Intel 82599 10 GbE Controller Datasheet", Revision 2.76, Sep. 2012, Section 8.2.3.23, pp. 713-738. URL: <http://www.intel.com/content/www/us/en/ethernet-controllers/82599-10-gbe-controller-datasheethtml>. Obtained from the Internet Archive's Wayback Machine on Oct. 7, 2013. URL: <http://archive.org/web/web.php>.

*Primary Examiner* — Cam-Linh Nguyen
(74) *Attorney, Agent, or Firm* — Winthrop & Weinstine, P.A.

(57) ABSTRACT

A method for detecting hardware and/or software anomalies in remote systems. The method may include aggregating, in a centralized electronic database, by an electronic database server, data received via a network from each of the remote systems, the data relating to operating statistics of one or more subcomponents of the remote systems over time. The method may also include utilizing an electronic database client communicatively coupled to the centralized database to automatically periodically access and analyze data stored in the centralized database to identify anomalies in hardware and/or software components of the remote systems. In one embodiment, the data relating to operating statistics of the subcomponents may include data from statistics counters corresponding to the subcomponents, each statistics counter, in one state, indicative of an identifiable error. In this regard, analyzing data stored in the centralized database may involve comparing data from the statistics counters to identify the anomalies.

18 Claims, 3 Drawing Sheets

(56) References Cited

U.S. PATENT DOCUMENTS

| | | | |
|---|---|---|---|
| 8,434,151 B1* | 4/2013 | Franklin | 726/24 |
| 8,949,674 B2* | 2/2015 | Mancoridis et al. | 714/38.1 |
| 8,978,139 B1* | 3/2015 | Banerjee et al. | 726/24 |
| 9,141,914 B2* | 9/2015 | Viswanathan | G06N 99/005 |
| 2004/0181664 A1* | 9/2004 | Hoefelmeyer | H04L 63/0272 |
| | | | 713/157 |
| 2005/0182750 A1* | 8/2005 | Krishna et al. | 707/1 |
| 2005/0216241 A1* | 9/2005 | Entin et al. | 703/2 |
| 2005/0216793 A1* | 9/2005 | Entin et al. | 714/38 |
| 2006/0085854 A1* | 4/2006 | Agrawal et al. | 726/23 |
| 2006/0187017 A1* | 8/2006 | Kulesz et al. | 340/506 |
| 2006/0190460 A1* | 8/2006 | Chandrasekaran et al. | 707/100 |
| 2006/0265694 A1* | 11/2006 | Chilimbi et al. | 717/124 |
| 2007/0028219 A1* | 2/2007 | Miller | G05B 23/021 |
| | | | 717/124 |
| 2007/0168696 A1* | 7/2007 | Ridel | G06F 11/3495 |
| | | | 714/4.1 |
| 2008/0016572 A1* | 1/2008 | Burkhardt et al. | 726/24 |
| 2008/0244319 A1* | 10/2008 | Nehab et al. | 714/38 |
| 2009/0165135 A1* | 6/2009 | Lomont et al. | 726/22 |
| 2009/0281977 A1* | 11/2009 | Allen | G06F 21/577 |
| | | | 706/47 |
| 2010/0031076 A1* | 2/2010 | Wan | G06F 11/3062 |
| | | | 713/340 |
| 2010/0107257 A1* | 4/2010 | Ollmann | 726/24 |
| 2011/0010697 A1* | 1/2011 | Golovkin | 717/155 |
| 2011/0093471 A1* | 4/2011 | Brockway et al. | 707/747 |
| 2011/0154119 A1* | 6/2011 | Wang | H04L 41/0631 |
| | | | 714/37 |
| 2011/0154487 A1* | 6/2011 | Nakayama et al. | 726/22 |
| 2011/0247071 A1* | 10/2011 | Hooks et al. | 726/24 |
| 2011/0295783 A1* | 12/2011 | Zhao | G06F 17/30702 |
| | | | 706/12 |
| 2013/0111357 A1* | 5/2013 | McCormack et al. | 715/753 |
| 2014/0040449 A1* | 2/2014 | Kinoshita et al. | 709/223 |
| 2014/0279507 A1* | 9/2014 | Whitler | G06Q 20/4016 |
| | | | 705/44 |
| 2015/0052606 A1* | 2/2015 | Romero Bueno et al. | 726/23 |

* cited by examiner

DETECTING HARDWARE AND SOFTWARE PROBLEMS IN REMOTE SYSTEMS

FIELD OF THE INVENTION

The present disclosure relates to detecting hardware and software problems in remote systems. Particularly, the present disclosure relates to detecting hardware and software problems in remote systems for analysis, correction, and/or support.

BACKGROUND OF THE INVENTION

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Consumers depend on the availability and reliability of their information handling systems, and as such systems become more complex, the reliability of, and support of, these systems becomes increasingly important. Some tools, such as software debuggers, exist that permit users or support personnel to connect across a computer network in order to analyze individual systems and provide appropriate support. However, such tools allow analysis of an individual system in seclusion and are not configured for detecting hardware anomalies. Likewise, other tools, such as intrusion detection systems, detect statistical anomalies in network traffic for purposes of pinpointing network attacks. However, such tools are directed to network activity and are not configured for detecting system hardware and software anomalies.

Thus, there is a need in the art for systems and methods for automating the detection of hardware and software anomalies. Also needed are systems and methods that can automatically analyze system state and performance based on data received at a centralized database or collection of databases from a plurality of remote systems to detect software and hardware anomalies in the remote systems. Better analysis of this data can lead to more proactive responses to customer hardware and software issues, perhaps even before customers become aware of those issues. Additionally, having automated detection of these anomalies can help detect regressions in software performance, for example, after version updates.

BRIEF SUMMARY OF THE INVENTION

The following presents a simplified summary of one or more embodiments of the present disclosure in order to provide a basic understanding of such embodiments. This summary is not an extensive overview of all contemplated embodiments, and is intended to neither identify key or critical elements of all embodiments, nor delineate the scope of any or all embodiments.

The present disclosure, in one embodiment, relates to a method for detecting hardware and/or software anomalies in remote systems. The method may include aggregating, in a centralized electronic database, by an electronic database server, data received via a network from each of the remote systems, the data relating to operating statistics of one or more subcomponents of the remote systems over time. The method may also include utilizing an electronic database client communicatively coupled to the centralized electronic database to automatically periodically access and analyze data stored in the centralized electronic database to identify anomalies in hardware and/or software components of the remote systems. In one particular embodiment, the remote systems may each comprise a data storage system having a data storage system controller, a data storage device, and/or at least one network adapter. The method may further include, for each remote system, aggregating data received from each of the subcomponents thereof in a database local to the respective remote system. The data stored in the local databases may then be replicated to the centralized database. The subcomponents of each remote system may collect the operating statistics associated with the respective subcomponent for reporting to the local database for the remote system of which the subcomponent is a part. In some embodiments, the data may be received from the remote systems on a periodic basis while in other embodiments, the data may be requested on-demand, at the request of the database server or upon request of a user-operator. In one embodiment, the data relating to operating statistics of the subcomponents may include data from statistics counters corresponding to the subcomponents, each statistics counter, in one state, indicative of an identifiable error. In this regard, analyzing data stored in the centralized electronic database may involve comparing data from the statistics counters to identify the anomalies. In another embodiment, rules may be defined for identifying anomalies in the hardware and/or software components of the remote systems, and the rules may be applied to the data stored in the centralized electronic database.

The present disclosure, in another embodiment, relates to an information handling system that may include an electronic database server communicatively coupled with one or more remote systems, the electronic database server having a centralized electronic database associated with the remote systems and storing data received via a network from the remote systems relating to operating statistics of the subcomponents of the remote systems over time, and an electronic database client communicatively coupled to the electronic database server and configured to automatically periodically access and analyze data stored in the centralized electronic database to identify anomalies in the hardware and/or software components of the remote systems. As indicated above, in one particular embodiment, the remote systems may each comprise a data storage system having a data storage system controller, a data storage device, and at least one network adapter. In some embodiments, the information handling system may further include, for each remote system, a database local to the respective remote system for aggregating data received from each of the subcomponents thereof. Furthermore, data stored in the centralized electronic database may be replicated from the local databases of each remote system. In one embodiment, the data relating to operating statistics of the subcomponents of the remote systems over time may include data from statistics counters corresponding to the subcomponents, each statistics counter, in one state, indicative of an identifiable error. The electronic database client may thus be configured to analyze data stored in the centralized electronic database to identify anomalies by comparing data from the statistics counters to identify the anomalies.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

DETAILED DESCRIPTION

The present disclosure relates to novel and advantageous systems and methods for detecting hardware and software problems in remote systems. Particularly, the present disclosure relates novel and advantageous systems and methods for detecting hardware and software problems in remote systems for analysis, correction, and/or support.

For purposes of this disclosure, any system or information handling system described herein may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, a system or any portion thereof may be a personal computer (e.g., desktop or laptop), tablet computer, mobile device (e.g., personal digital assistant (PDA) or smart phone), server (e.g., blade server or rack server), a network storage device, or any other suitable device or combination of devices and may vary in size, shape, performance, functionality, and price. A system may include random access memory (RAM), one or more processing resources such as a central processing unit (CPU) or hardware or software control logic, ROM, and/or other types of nonvolatile memory. Additional components of a system may include one or more disk drives or one or more mass storage devices, one or more network ports for communicating with external devices as well as various input and output (I/O) devices, such as a keyboard, a mouse, touchscreen and/or a video display. Mass storage devices may include, but are not limited to, a hard disk drive, floppy disk drive, CD-ROM drive, smart drive, flash drive, or other types of non-volatile data storage, a plurality of storage devices, or any combination of storage devices. A system may include what is referred to as a user interface, which may generally include a display, mouse or other cursor control device, keyboard, button, touchpad, touch screen, microphone, camera, video recorder, speaker, LED, light, joystick, switch, buzzer, bell, and/or other user input/output device for communicating with one or more users or for entering information into the system. Output devices may include any type of device for presenting information to a user, including but not limited to, a computer monitor, a flat-screen display, or other visual display, a printer, and/or speakers or any other device for providing information in audio form, such as a telephone, a plurality of output devices, or any combination of output devices. A system may also include one or more buses operable to transmit communications between the various hardware components.

One or more programs or applications, such as a web browser, and/or other applications may be stored in one or more of the system data storage devices. Programs or applications may be loaded in part or in whole into a main memory or processor during execution by the processor. One or more processors may execute applications or programs to run systems or methods of the present disclosure, or portions thereof, stored as executable programs or program code in the memory, or received from the Internet or other network. Any commercial or freeware web browser or other application capable of retrieving content from a network and displaying pages or screens may be used. In some embodiments, a customized application may be used to access, display, and update information.

Hardware and software components of the present disclosure, as discussed herein, may be integral portions of a single computer or server or may be connected parts of a computer network. The hardware and software components may be located within a single location or, in other embodiments, portions of the hardware and software components may be divided among a plurality of locations and connected directly or through a global computer information network, such as the Internet.

As will be appreciated by one of skill in the art, the various embodiments of the present disclosure may be embodied as a method (including, for example, a computer-implemented process, a business process, and/or any other process), apparatus (including, for example, a system, machine, device, computer program product, and/or the like), or a combination of the foregoing. Accordingly, embodiments of the present disclosure may take the form of an entirely hardware embodiment, an entirely software embodiment (including firmware, middleware, microcode, hardware description languages, etc.), or an embodiment combining software and hardware aspects. Furthermore, embodiments of the present disclosure may take the form of a computer program product on a computer-readable medium or computer-readable storage medium, having computer-executable program code embodied in the medium, that define processes or methods described herein. A processor or processors may perform the necessary tasks defined by the computer-executable program code. Computer-executable program code for carrying out operations of embodiments of the present disclosure may be written in an object oriented, scripted or unscripted programming language such as Java, Perl, PHP, Visual Basic, Smalltalk, C++, or the like. However, the computer program code for carrying out operations of embodiments of the present disclosure may also be written in conventional procedural programming languages, such as the C programming language or similar programming languages. A code segment may represent a procedure, a function, a subprogram, a program, a routine, a subroutine, a module, an object, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In the context of this document, a computer readable medium may be any medium that can contain, store, communicate, or transport the program for use by or in connection with the systems disclosed herein. The computer-executable program code may be transmitted using any appropriate medium, including but not limited to the Internet, optical fiber cable, radio frequency (RF) signals or other wireless signals, or other mediums. The computer readable medium may be, for example but is not limited to, an electronic, magnetic, optical, electromagnetic, infrared, or semiconductor system, apparatus, or device. More specific examples of suitable computer readable medium include, but are not limited to, an electrical connection having one or more wires or a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device. Computer-readable media includes, but is not to be confused with, computer-readable storage medium, which is intended to cover all physical, non-transitory, or similar embodiments of computer-readable media.

Various embodiments of the present disclosure may be described herein with reference to flowchart illustrations and/or block diagrams of methods, apparatus (systems), and computer program products. It is understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks. Alternatively, computer program implemented steps or acts may be combined with operator or human implemented steps or acts in order to carry out an embodiment of the invention.

Additionally, although a flowchart may illustrate a method as a sequential process, many of the operations in the flowcharts illustrated herein can be performed in parallel or concurrently. In addition, the order of the method steps illustrated in a flowchart may be rearranged for some embodiments. Similarly, a method illustrated in a flow chart could have additional steps not included therein or fewer steps than those shown. A method step may correspond to a method, a function, a procedure, a subroutine, a subprogram, etc.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an ingredient or element may still actually contain such item as long as there is generally no measurable effect thereof.

As described above, consumers depend on the availability and reliability of their information handling systems, and as such systems become more complex, the reliability of, and support of, these systems becomes increasingly important. Some tools, such as software debuggers, exist that permit users or support personnel to connect across a computer network in order to analyze individual systems and provide appropriate support. However, such tools allow analysis of an individual system in seclusion and are not configured for detecting hardware anomalies. Likewise, other tools, such as intrusion detection systems, detect statistical anomalies in network traffic for purposes of pinpointing network attacks. However, such tools are directed to network activity and are not configured for detecting system hardware and software anomalies.

The various embodiments of the present disclosure help automate the detection of hardware and software anomalies. In general, the various embodiments of the present disclosure can gather and analyze data from remote hardware and software systems and processes the data in a way that identifies or highlights potential hardware and/or software anomalies in those remote systems. Upon detecting such anomalies, the various embodiments of the present disclosure may report them to the user(s) of the remote hardware and software systems and/or to a centralized database for quick and easy access or for historical purposes. In this regard, a need exists, which the various embodiments of the present disclosure fulfill, for automatically analyzing system state and performance based on data received at a centralized database or collection of databases from a plurality of remote systems to detect software and hardware anomalies in the remote systems. Better analysis of this data can lead to more proactive responses to customer hardware and software issues, perhaps even before customers become aware of those issues. Additionally, having automated detection of these anomalies can help detect regressions in software performance, for example, after version updates. The various embodiments of the present disclosure are applicable for any company, and particularly technology companies, having hardware that is remotely located, e.g., "out in the field," that the company supports, and which is, or can be configured to, report feedback data to a centralized database. For example, the various embodiments of the present disclosure may be utilized to identify network problems. As an example, a network adapter may be detecting incorrect check sums of data from time to time, due to, for example, a failing network cable or switch or even a faulty network adapter. Comparison of network data received over time from various remote and communicatively coupled systems that are properly computing check sums could be utilized to detect and correct the problem, with little impact to the system owner of the network adapter.

Figure 1:
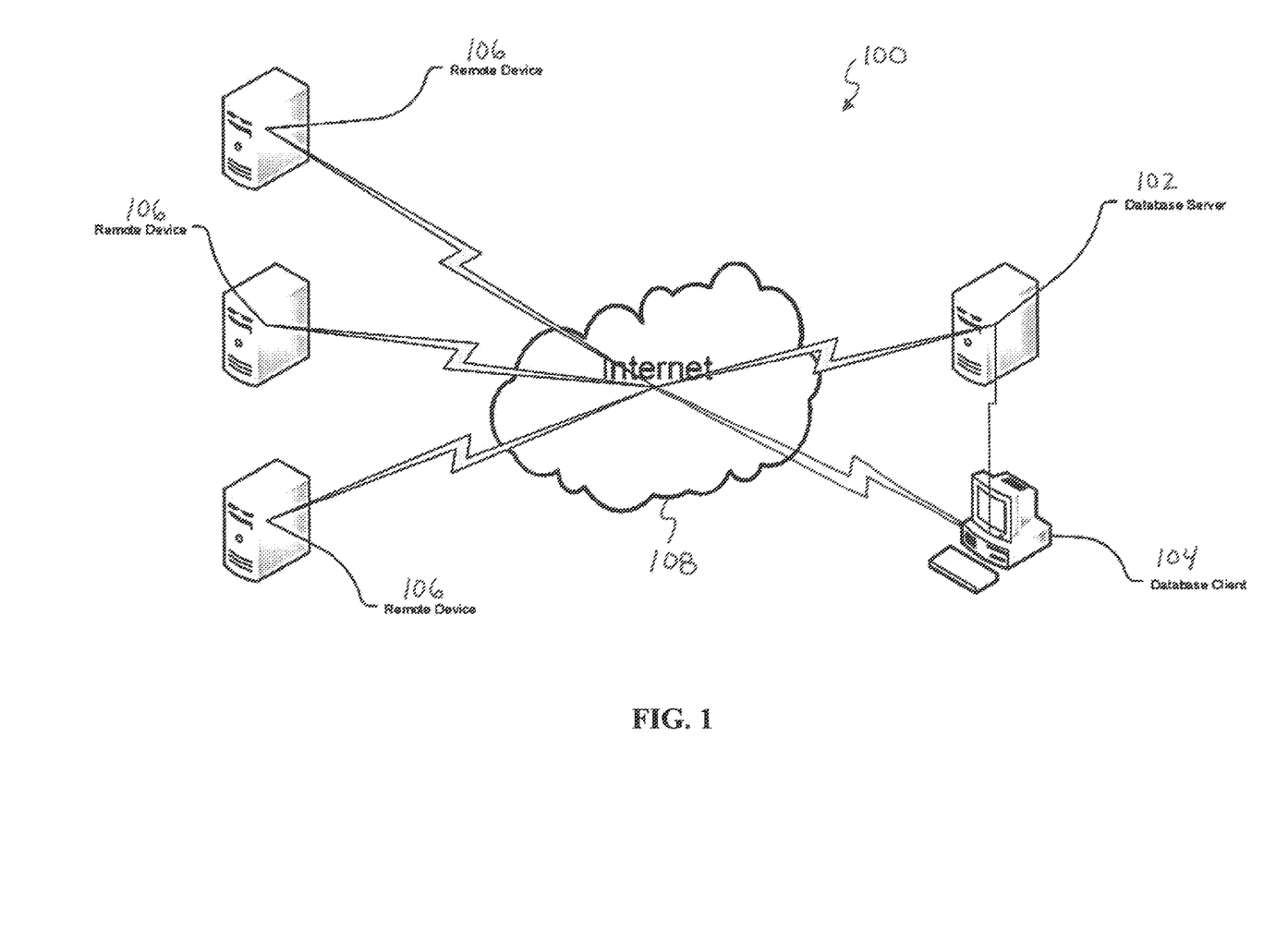
FIG. 1 is a schematic diagram of a system configuration suitable for the methods of automating the detection of hardware and software anomalies in accordance with the various embodiments of the present disclosure.

More specifically, the various embodiments of the present disclosure include fully automated and human-assisted methods for detecting hardware and/or software problems or anomalies in remote systems or equipment, taking advantage of a centralized database of reporting data received from, or about, the remote systems or equipment. FIG. 1 schematically illustrates a system configuration suitable for the methods of detecting of hardware and software anomalies in accordance with one embodiment of the present disclosure. The system 100 may include a database server 102 including, or communicatively coupled with, a database accessible via a database client 104. The system 100 may also include one or more remote devices or systems 106 communicatively coupled with the database server via a network 108, such as but not limited to a local area network (LAN), wide area network (WAN), such as the Internet, or any other suitable communications network, wired or wireless. Each remote device 106 may be a standalone device or, in cooperation with other hardware and/or software, may form part of a larger remote system.

The remote devices 106 may each be any suitable remotely connected device comprised of hardware and/or software components. That is, a remote device 106 could be comprised of entirely hardware components, entirely software components, or a combination of both hardware and software. For example, in one embodiment, particularly relating to supporting a data storage system, a remote device 106 may include, but is not limited to, one or more data storage management servers/controllers, one or more data storage devices or enclosures of multiple data storage devices, and/or one or more network adapters. Of course, the various embodiments of the present disclosure are not limited to use in supporting data storage systems, but are applicable in supporting any suitable hardware and/or software system for which remote support may be necessary or desirable. In some embodiments, for example only, a remote device 106 may be, or contain, various combinations of similar or identical modular hardware, such as network adapters and/or storage adapters.

A remote device or system 106 may include an operating system and other corresponding driver and application software for operating the device/system. The software programmed with the remote device 106 may generally operate the subcomponents or adapter(s) within the device to perform a particular application or function. As illustrated in step 202 of FIG. 2, which is a flow diagram of one method of the present disclosure, as the software executes on the remote device 160, and accesses the adapter(s) within the remote device, the adapter(s) within the remote device may collect and report statistics relating to the adapter hardware and/or software. For example only, a network adapter may report how often its network link is connected or disconnected, how many times it has detected the receipt of corrupt data, Ethernet or TCP/IP statistics, etc. In addition, as the software executes on the remote device, the software may record events that occur as it interacts with the corresponding drivers, such as frequency and type of interrupts, the processing unit on which the interrupt occurred, etc. The software may report and save a counter for each interrupt as it occurs, keeping track of each type of interrupt. Similarly, the software may record information about the hardware and software in general, including but not limited to, how the hardware is physically configured, how the software is configured, the versions of the hardware and/or software utilized, etc.

Further statistics, provided only as non-limiting examples of potential statistics, that may be reported by remote devices may include or relate to, but are certainly not limited to: pause frames received and/or transmitted; IP header errors; unknown protocols; IP reassembly, IP reassembly success or failure, and/or TCP transmits; TCP statistics; TCP open connections, passive open connections received, and/or reset connections; etc. Still further statistics, also provided only as non-limiting examples of potential statistics, that may be reported by remote devices may include or relate to, but are certainly not limited to, those provided in the detailed listing of statistics registers in Section 8.2.3.23 of the datasheet for an Intel® controller, titled Intel® 82599 10 Gbe Controller Datasheet, September 2012, Revision 2.76, published, for example, at http://www.intel.com/content/www/us/en/ethernet-controllers/82599-10-gbe-controller-datasheet.html, and which is incorporated by reference herein in its entirety.

Figure 2:
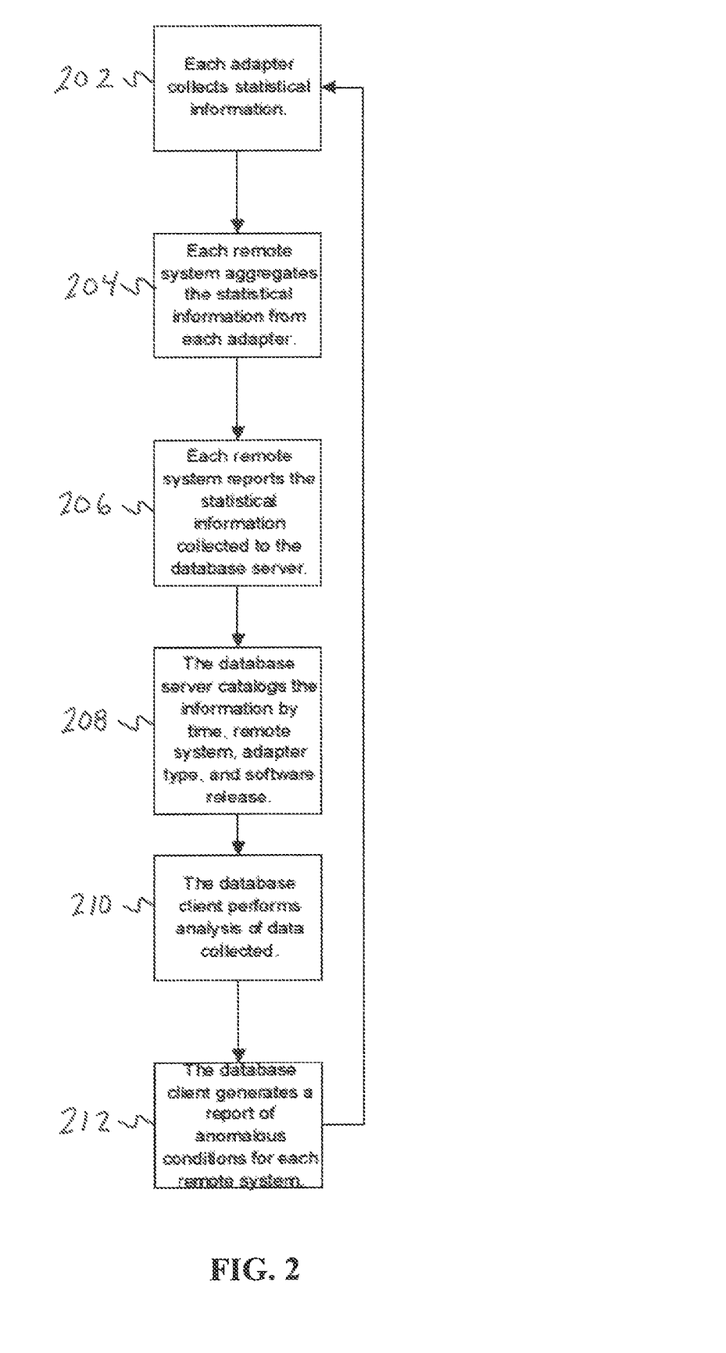
FIG. 2 is a flow diagram of a method for automating the detection of hardware and software anomalies, in accordance with an embodiment of the present disclosure.

In step 204, each remote device 106 may aggregate statistics received from each of its subcomponents or adapters into a database for that remote device. The database for each remote device 106 may be updated as the software continues to execute. In step 206, additionally or alternatively, the remote device 106 may replicate or transmit the statistics received from the adapters or stored in its database to the database server 102 via network 108. While generally referred to as adapters, the remote devices may include any number of suitable adapters or other subcomponents which are configured to collect and report statistics relating to its corresponding hardware and/or software, and the remote devices or systems 106 described herein are not limited to including only those subcomponents that may typically be understood as "adapters."

The replication may be performed according to any schedule, including but not limited to, continuously, periodically, or even randomly. In additional or alternative embodiments, the replication may be performed on-demand, either on request of the database server or other system 100 component, or upon user request. In one embodiment, the replication may be performed automatically according to a predefined, periodic schedule.

As indicated in step 208, the database server 102 may receive the data from the remote devices or systems 106 and store the data in the system 100 database, which may comprise a single database or a plurality of communicatively coupled databases, as may be desired. In one embodiment, the database server 102 may aggregate, sort, and/or store the data from each remote device 106 in the database so that the database client 104 can access it in an organized manner, such as but not limited to, chronologically, by remote device, by adapter in each remote device, and/or by statistic, etc. The database client can then access the data from the system 100 database via network 108 or a local network/connection 110, using a database query language, such as but not limited to, sequential query language (SQL). Ultimately, the result is a structured system database having system information from each remote device 106 about the adapters within those remote devices, and which has been received over time.

According to the various embodiments of the present disclosure, the data stored in the system database, accessible via the database client 104, may be utilized and compared in a manner to detect remote hardware and/or software problems for correction, potentially even before the remote device owner is even aware of the problems. More specifically, as indicated in step 210 of FIG. 2, the data collected in aggregate from a system of several communicatively coupled remote devices and stored in the system database may be used to detect isolated hardware anomalies or faults and isolated and/or systemic software failures by comparing, or performing some other suitable analysis on, the aggregated hardware and/or software statistics of the remote devices.

Several methods may be utilized separately or in combination by the database client 104, automatically or in the control of a user-operator, in order to access and operate on the database server 102 to detect conditions indicating anomalies/failures. According to one method, the data reported by the remote devices to the system database may include one or more error statistics counters. As will be appreciated by those skilled in the art, many error statistics counters used to keep track of errors in hardware and software more commonly register "zero," indicating that no failure has been detected. For example, overrun or underrun counters may increment when Ethernet frames are not of the required size, another counter may increment each time a network packet is dropped, or other counters relating to one or more of the statistics identified above may be incremented when an irregularity is detected. Using the database, statistics counters across many different remote devices can be queried, automatically according to a program or at the control of a user-operator, and compared. If the statistics counter from one or more corresponding remote devices indicate a failure (i.e., return with a non-zero count value) while the statistics counter corresponding to other remote devices do not, for example, then an anomaly may be identified, and may indicate an actual hardware and/or software failure among the group of remote devices that indicate a failure.

Likewise, according to another method for detecting conditions indicating anomalies/failures, because statistics may be reported by, and collected from, the various remote devices overtime, one can compare the state of any given error statistics counter from the same adapter in the same remote device at different points in time. Error statistics counters that have a history of being zero for a given adapter, but that later indicate one or more samples of non-zero count values can also be an indicator of hardware and/or software failure.

According to still another method for detecting conditions indicating anomalies/failures, a user-operator, support engineer, or other suitable user may define one or more programmatic rules to identify particular patterns of error statistics counter data or other data that would tend to indicate anomalous hardware or software conditions. Any number and combination of rules may be defined, and the rules defined may vary from system to system, depending, for example, on the intended function of the remote devices and contained adapters. Once defined, the one or more rules may each automatically operate to identify when the statistics satisfy a rule.

According to yet another method for detecting conditions indicating anomalies/failures, errors caused by software changes or upgrades may be detected. Particularly, software changes or upgrades that result in changes to certain statistics, which initially returned zero error counts in a particular remote system's hardware statistics became non-zero value counts after a software upgrade, tend to indicate a systemic failure in that particular software release.

As indicated above, any of the above-described methods may be utilized separately or in combination by the database client 104, automatically or in the control of a user-operator, in order to access and operate on the database server 102 to detect conditions indicating anomalies/failures. For example, a combination of the above-described method for comparing statistics counters across many different remote devices and the above-described method for comparing the state of any given error statistics counter from the same adapter in the same remote device at different points in time may lead to particularly strong indications of hardware and/or software failure, in which a statistics counter may be zero across many different remote devices and adapters, but for a given remote device and adapter, the statistic becomes non-zero. While some methods of determining anomalies or failures from the collected data have been described, it is recognized that the data stored in the system database and accessible via the database client 104, may be utilized and compared in any suitable manner designed to detect remote hardware and/or software problems for correction, and all of such methods are considered within the scope of the present disclosure, which is more generally directed to aggregating data from a system of several network coupled remote devices, wherein the aggregated data may be used to detect isolated hardware anomalies or faults and isolated and/or systemic software failures by comparing aggregated hardware and/or software statistics of the remote devices.

In additional embodiments, the system 100 may also include means for overriding false positive reports. Any means may be used. However, in one embodiment, a user-operator, support engineer, or other suitable user may define one or more programmatic rules that silence or override certain indications of anomalies, where those anomalies would have otherwise been identified according to the above-described methods or other methods. Again, any number and combination of false positive rules may be defined, and the rules defined may vary from system to system, depending, for example, on the intended function of the remote devices and contained adapters.

In some embodiments, the database client may operate on the system database to detect anomalies/failures according to any schedule, including but not limited to, continuously, periodically, or even randomly. In additional or alternative embodiments, the database client may operate on the system database on-demand, either on request of the database client or upon user request, for example. In one embodiment, the database client may operate on the system database automatically according to a predefined, periodic schedule. Although not required, the database client may operate on the system database to detect anomalies/failures utilizing the most recent data obtained from the remote devices; however, past data may be suitable utilized if, and when, desired, such as but not limited to, in the above-described method for comparing the state of any given error statistics counter from the same adapter in the same remote device at different points in time.

Based on the analysis by the database client, the database client or other component of the system may generate one or more alerts for when an anomalous condition is detected.

Depending on the anomaly detected, the system may automatically take measures to correct the anomaly/failure. Additionally or alternatively, in step 212 of FIG. 2, the system may generate a human-readable report with the anomalous conditions detected for user intervention and correction, if needed.

The various embodiments of the present disclosure are advantageous for a variety of reasons. For example, automating tasks, such as the detection of hardware and/or software problems described above, provides more proactive support and allows support and development engineers to remotely detect problems with hardware and/or software located off-site with relative ease, and in some cases prior to the owner of the hardware and/or software becoming aware of the problem.

The various embodiments herein have been described with respect to information handling systems. While the various embodiments are not limited to any particular type of information handling system, the systems and methods of the present disclosure may be particularly useful in the context of a storage center comprising mass storage devices, such as but not limited to disk drive systems, or virtual disk drive systems, such as that described in U.S. Pat. No. 7,613,945, titled "Virtual Disk Drive System and Method," issued Nov. 3, 2009, the entirety of which is hereby incorporated herein by reference.

Figure 3:
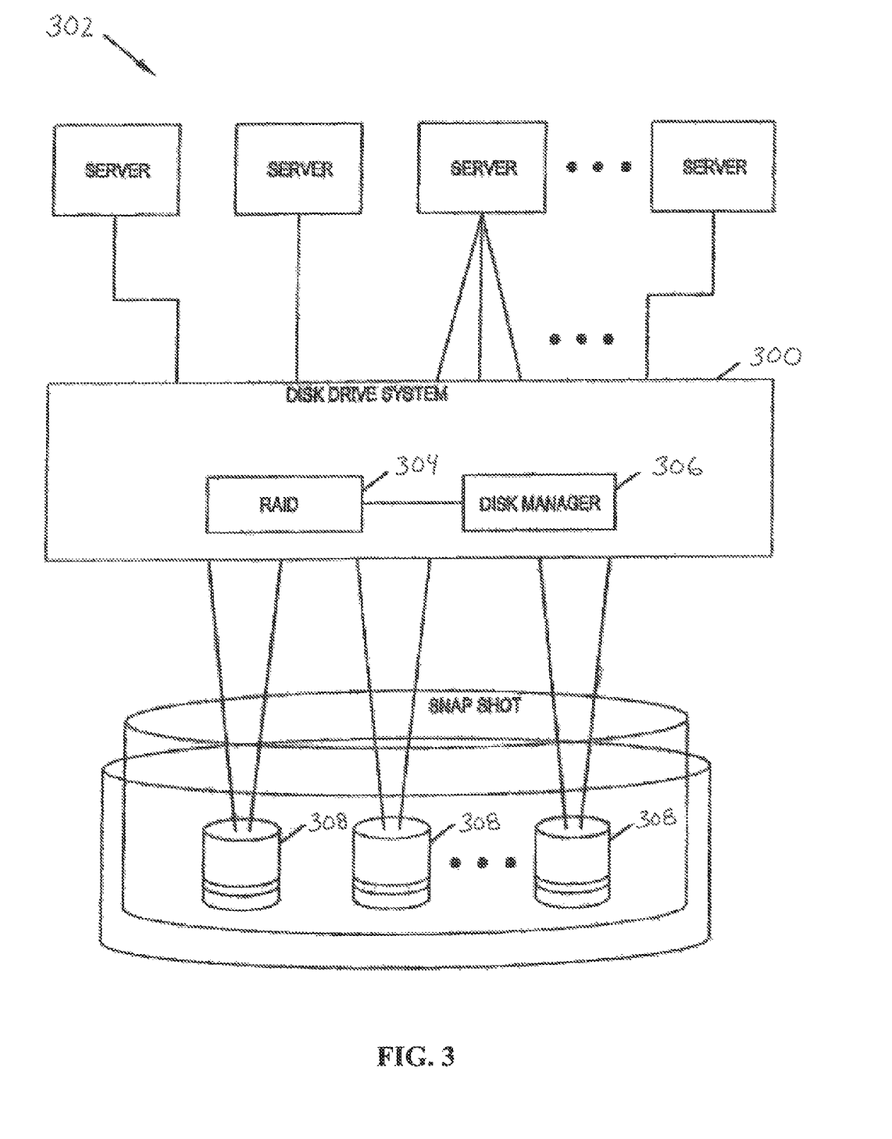
FIG. 3 is a schematic diagram of a data storage system that may benefit from the systems and methods for automating the detection of hardware and software anomalies of the present disclosure.

FIG. 3 illustrates one embodiment of a disk drive or data storage system 300 in an information handling system environment 302, such as that disclosed in U.S. Pat. No. 7,613,945, and suitable with the various embodiments of the present disclosure. As shown in FIG. 3, the disk drive system 300 may include a data storage subsystem 304, which may include, but is not limited to, a RAID subsystem, as will be appreciated by those skilled in the art, and a disk manager 306 having at least one disk storage system controller. The data storage subsystem 304 and disk manager 306 can dynamically allocate data across disk space of a plurality of disk drives or other suitable storage devices 308, such as but not limited to optical drives, solid state drives, tape drives, etc., based on, for example, RAID-to-disk mapping or other storage mapping technique. The data storage subsystem 304 may include data storage devices distributed across one or more data sites at one or more physical locations, which may be network connected. Any of the data sites may include original and/or replicated data (e.g., data replicated from any of the other data sites) and data may be exchanged between the data sites as desired. In such systems, or other data storage systems, the various embodiments of the present disclosure may, for example, be utilized to detect hardware and/or software anomalies in remotely located data storage system managers and controllers, disk enclosures or other storage device enclosures and adapters, and/or network adapters.

In the foregoing description, various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

I claim:

1. A method for detecting hardware and/or software anomalies in remote systems, the method comprising:
aggregating, in a centralized electronic database, by an electronic database server, data received via a network from each of the remote systems, the data relating to operating statistics of each of one or more subcomponents of the remote systems over time, each remote system being separate and operably independent from the other remote systems and comprising a data storage system having a data storage system controller and a data storage device;
utilizing an electronic database client communicatively coupled to the centralized electronic database to automatically periodically access and analyze data stored in the centralized electronic database to identify anomalies in at least one of hardware and/or software components of one or more of the remote systems; and
applying one or more false positive rules to the identified anomalies to detect a falsely identified anomaly, and where a falsely identified anomaly is detected, overriding the identification of the falsely identified anomaly as an anomaly:
wherein the data relating to operating statistics of each of one or more subcomponents of the remote systems over time comprises data from statistics counters corresponding to the one or more subcomponents, each statistics counter with a non-zero count value identifying an occurrence of an error.

2. The method of claim 1, wherein the remote systems each comprise at least one network adapter.

3. The method of claim 1, further comprising, for each remote system, aggregating data received from each of the one or more subcomponents thereof in a database local to the respective remote system.

4. The method of claim 3, wherein aggregating data received via a network from each of the remote systems comprises receiving, via the network, replicated data from each of the local databases of each remote system.

5. The method of claim 4, further comprising, for each of the one or more subcomponents of a remote system, collecting operating statistics associated with the respective subcomponent for reporting to the database local to the remote system of which the subcomponent is a part.

6. The method of claim 1, wherein aggregating data received via a network from each of the remote systems comprises receiving data from the remote systems on a periodic basis.

7. The method of claim 1, wherein aggregating data received via a network from each of the remote systems comprises receiving data from the remote systems on-demand, at the request of the database server.

8. The method of claim 1, wherein aggregating data received via a network from each of the remote systems comprises receiving data from the remote systems upon request of a user-operator.

9. The method of claim 1, wherein analyzing data stored in the centralized electronic database to identify anomalies comprises comparing data from the statistics counters to identify the anomalies.

10. The method of claim 9, further comprising defining rules for application against the data in the centralized electronic database, the rules designed to identify anomalies in the at least one of the hardware and/or software components of one or more of the remote systems, wherein analyzing data stored in the centralized electronic database to identify anomalies comprises applying the rules to the data stored in the centralized electronic database.

11. The method of claim 1, further comprising utilizing the electronic database client to access and automatically analyze, at the request of a user-operator, data stored in the centralized electronic database to identify anomalies in the at least one of hardware and/or software components of one or more of the remote systems.

12. The method of claim 1, further comprising generating and outputting a visual report of identified anomalies.

13. The method of claim 1, further comprising automatically taking measures to resolve a failure in at least one of the hardware and/or software components of a remote system identified as associated with an anomaly.

14. An information handling system comprising:
   a plurality of remote systems, each remote system being separate and operably independent from the other remote systems and comprising a data storage system having a data storage system controller, a data storage device, and at least one network adapter;
   an electronic database server communicatively coupled with the plurality of remote systems, the electronic database server comprising a centralized electronic database associated with the remote systems and storing data received via a network from the plurality of remote systems relating to operating statistics of each of one or more subcomponents of the plurality of remote systems over time; and
   an electronic database client communicatively coupled to the electronic database server and configured to automatically periodically access and analyze data stored in the centralized electronic database to identify anomalies in at least one of hardware and/or software components of one or more of the plurality of remote systems; and
   one or more false positive rules configured to detect a falsely identified anomaly, and where a falsely identified anomaly is detected, override the identification of the falsely identified anomaly as an anomaly;
   wherein the data relating to operating statistics of each of one or more subcomponents of the plurality of remote systems over time comprises data from statistics counters corresponding to the one or more subcomponents.

15. The information handling system of claim 14, further comprising, for each remote system, a database local to the respective remote system for aggregating data received from each of the one or more subcomponents thereof.

16. The information handling system of claim 15, wherein the data stored in the centralized electronic database is replicated from the local databases of each remote system.

17. The information handling system of claim 14, wherein the electronic database client is configured to analyze data stored in the centralized electronic database to identify anomalies by comparing data from the statistics counters to identify the anomalies.

18. A method for detecting hardware and/or software anomalies in remote systems, the method comprising:
   aggregating, in a centralized electronic database, by an electronic database server, data received via a network from each of the remote systems, the data relating to operating statistics of each of one or more subcomponents of the remote systems over time, each remote system being separate and operably independent from the other remote systems and comprising a data storage system having a data storage system controller and a data storage device; and
   utilizing an electronic database client communicatively coupled to the centralized electronic database to automatically periodically access and analyze data stored in the centralized electronic database to identify anomalies in at least one of hardware and/or software components of one or more of the remote systems; and
   applying one or more false positive rules to the identified anomalies to detect a falsely identified anomaly, and where a falsely identified anomaly is detected, overriding the identification of the falsely identified anomaly as an anomaly;
   wherein the data relating to operating statistics of each of one or more subcomponents of the remote systems over time comprises data from statistics counters corresponding to the one or more subcomponents.

* * * * *

UNITED STATES PATENT AND TRADEMARK OFFICE
CERTIFICATE OF CORRECTION

PATENT NO. : 9,817,742 B2
APPLICATION NO. : 13/925910
DATED : November 14, 2017
INVENTOR(S) : Ryan Hankins Page 1 of 1

It is certified that error appears in the above-identified patent and that said Letters Patent is hereby corrected as shown below:

In the Specification

Column 7, Line 64, delete "160" and insert --106-- therefor.

Column 8, Line 67, delete "110".

In the Claims

Column 12, Line 25, Claim 1 delete ":" and insert --;-- therefor.

Column 13, Line 29, Claim 14 delete "and".

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*